US012232450B2

(12) United States Patent
Fattey et al.

(10) Patent No.: US 12,232,450 B2
(45) Date of Patent: Feb. 25, 2025

(54) AUTONOMOUS NAVIGATION SYSTEM AND THE VEHICLE MADE THEREWITH

(71) Applicant: Moog Inc., East Aurora, NY (US)

(72) Inventors: Michael G. Fattey, Lancaster, NY (US); Kevin M. Eschner, Eden, NY (US); Joseph C. Baldi, Buffalo, NY (US); Jason M. Majchrzak, Orchard Park, NY (US)

(73) Assignee: Moog Inc., East Aurora, NY (US)

(*) Notice: Subject to any disclaimer, the term of this patent is extended or adjusted under 35 U.S.C. 154(b) by 0 days.

(21) Appl. No.: 16/978,890

(22) PCT Filed: Mar. 13, 2019

(86) PCT No.: PCT/US2019/022153
§ 371 (c)(1),
(2) Date: Sep. 8, 2020

(87) PCT Pub. No.: WO2019/178299
PCT Pub. Date: Sep. 19, 2019

(65) Prior Publication Data
US 2020/0404846 A1 Dec. 31, 2020

Related U.S. Application Data

(60) Provisional application No. 62/642,293, filed on Mar. 13, 2018.

(51) Int. Cl.
*A01D 46/30* (2006.01)
*A01D 46/26* (2006.01)
(Continued)

(52) U.S. Cl.
CPC ............. *A01D 46/30* (2013.01); *A01D 46/26* (2013.01); *G05D 1/0022* (2013.01);
(Continued)

(58) Field of Classification Search
CPC ........ A01D 46/30; A01D 46/26; A01D 46/00; G05D 1/0022; G05D 1/0061;
(Continued)

(56) References Cited

U.S. PATENT DOCUMENTS

| 5,974,348 A | 10/1999 | Rocks |
| 6,052,647 A | 4/2000 | Parkinson et al. |

(Continued)

FOREIGN PATENT DOCUMENTS

| CN | 105453814 B | 6/2017 |
| DE | 102008009753 B3 | 9/2009 |

(Continued)

OTHER PUBLICATIONS

Machine Translation: EP-2302995-B1 (year:2012).*
(Continued)

*Primary Examiner* — Anne Marie Antonucci
*Assistant Examiner* — Connor L Knight
(74) *Attorney, Agent, or Firm* — Harter Secrest & Emery LLP (57) ABSTRACT

An autonomous agricultural vehicle including a wheel-set operably connected with a power source, a processing unit having a memory unit, and a controller operable to receive and transmit signals to the processing unit, wherein the controller is operable to control the wheel-set. The autonomous agricultural vehicle further including a wireless communication system electrically connected with the processing unit, a global positioning satellite receiver electrically connected with the processing unit, a first perception sensor electrically connected with the processing unit, wherein the first perception sensor is operable to detect environmental features, and a second perception sensor electrically connected with the processing unit, wherein the second perception sensor is operable to detect a feature of a tree. Wherein (Continued)

the processing unit is operable to navigate an environment utilizing signals from the global positioning satellite receiver, and wherein the processing unit is operable to navigate the environment utilizing signals from the first and second perception sensors in a GPS denied environment.

20 Claims, 12 Drawing Sheets

(51) Int. Cl.
  *G05D 1/00* (2024.01)
  *G05D 1/02* (2020.01)
(52) U.S. Cl.
  CPC ......... *G05D 1/0061* (2013.01); *G05D 1/0094* (2013.01); *G05D 1/0278* (2013.01)
(58) Field of Classification Search
  CPC .............. G05D 1/0094; G05D 1/0278; G05D 2201/0201; A01B 79/005; G01S 19/14
  See application file for complete search history.

(56) References Cited

U.S. PATENT DOCUMENTS

| | | | | |
|---|---|---|---|---|
| 7,757,471 B2 * | 7/2010 | Mayo | ...................... | A01D 46/26 701/41 |
| 8,195,342 B2 * | 6/2012 | Anderson | ............ | G05D 1/0088 701/1 |
| 9,462,749 B1 * | 10/2016 | Jens | ...................... | G06T 7/0004 |
| 9,877,428 B2 * | 1/2018 | Moore | ................... | A01D 46/30 |
| 10,149,468 B2 * | 12/2018 | Crinklaw | ............. | A01M 7/0089 |
| 2005/0126144 A1 * | 6/2005 | Koselka | ................. | A01D 46/30 56/10.2 R |
| 2008/0033645 A1 * | 2/2008 | Levinson | ................ | G01S 19/49 701/469 |
| 2012/0179349 A1 * | 7/2012 | Yamakado | .......... | B60W 30/045 701/89 |
| 2016/0272196 A1 * | 9/2016 | Hocking | ............... | B60W 30/02 |
| 2017/0053536 A1 * | 2/2017 | Wright | ................... | H04N 7/183 |
| 2017/0356747 A1 * | 12/2017 | Iagnemma | ......... | G01C 21/3461 |
| 2018/0095476 A1 * | 4/2018 | Madsen | .................. | G01S 19/49 |
| 2018/0116115 A1 * | 5/2018 | Rotole | ................... | A01D 78/14 |
| 2021/0000013 A1 * | 1/2021 | Robertson | ............ | A01D 46/253 |

FOREIGN PATENT DOCUMENTS

| | | | | |
|---|---|---|---|---|
| EP | 1369013 D1 | | 12/2003 | |
| EP | 2302995 B1 * | | 3/2012 | .......... A01D 43/073 |
| WO | 2016116888 A1 | | 7/2016 | |
| WO | WO-2018117872 A1 * | | 6/2018 | |

OTHER PUBLICATIONS

European Patent Office (ISA/EP), International Search Report and Written Opinion from International Patent Application No. PCT/US2019/022153, issued May 24, 2019.

* cited by examiner

AUTONOMOUS NAVIGATION SYSTEM AND THE VEHICLE MADE THEREWITH

TECHNICAL FIELD

The presently disclosed subject matter relates generally to a vehicle for autonomous operation, and more specifically, to an autonomous navigation system for GPS limited or denied environments.

BACKGROUND

When the harvest of a particular orchard crop occurs, the specific crops on each of thousands of trees become ripe at about generally the same time. Harvest of these thousands of trees is a time consuming process which must be completed quickly while the crop is optimally ripe, and it is therefore advantageous to create systems that complete the harvesting operations as quickly as possible. The conventional solution for rapidly harvesting tree crops includes mechanized tree harvesters. Such harvesters generally are driven to a location proximate to a tree to be harvested, and a shaker head extends towards the tree. The shaker head generally includes movable jaws with pads that clamp the tree and a motor that powers the shaking process. Different types of trees require different clamping positions on the trunk. Larger trees, and trees that have been grafted to a larger rootstock, are often clamped higher from the ground, and trees that are leaning are often clamped at an angle.

When it is desired that the crop not touch the ground, harvest equipment with catching frames are used. This harvest method typically operates with a pair of harvesters: a shaker-equipped vehicle with a catching frame which operates on one side of a tree and a crop receiving vehicle with a catching frame on the other side of the tree. Both harvest vehicles must be propelled to and stop at a location alongside each of the trees to be harvested in order to catch the crop.

Additionally, many orchards utilize blossom thinning and/or pruning to facilitate an improved crop yield. Conventionally, large orchards have utilized chemical blossom thinners in crop load management. However, an increase in demand for organic produce has limited the viability of conventional techniques.

The present disclosure provides a system and method describing a more effective and efficient automated navigation system for, inter alia, orchard harvesting and/or pruning.

BRIEF SUMMARY

With parenthetical reference to corresponding parts, portions or surfaces of the disclosed embodiment, merely for the purposes of illustration and not by way of limitation, the present disclosure provides in a first exemplary embodiment, an autonomous agricultural vehicle, comprising: a wheel-set (160, 166) operably connected with a power source (154); a processing unit (112) including a memory unit; a controller (114) operable to receive and transmit signals to said processing unit, wherein said controller is operable to control said wheel-set; a wireless communication system (130, 132) electrically connected with said processing unit; a global positioning satellite receiver (118) electrically connected with said processing unit; a first perception sensor (116, 120, 122, 124, 126, 128) electrically connected with said processing unit, wherein said first perception sensor is operable to detect environmental features; and a second perception sensor (116, 120, 122, 124, 126, 128) electrically connected with said processing unit, wherein said second perception sensor is operable to detect a feature of a tree; wherein said processing unit is operable to navigate an environment utilizing signals from said global positioning satellite receiver; and wherein said processing unit is operable to navigate said environment utilizing signals from said first and second perception sensors in a GPS denied environment.

The present disclosure provides in a second exemplary embodiment, an autonomous vehicle, comprising: a wheel-set (160, 166) operably connected with a power source (154); a processing unit (112) including a memory unit; a controller (114) operable to receive and transmit signals to said processing unit, wherein said controller is operable to control said wheel-set; a wireless communication system (130, 132) electrically connected with said processing unit; a plurality of perception sensors (116, 120, 122, 124, 126, 128) operable to transmit a signal to said processing unit, wherein said plurality of perception sensors is operable to detect environmental features; and a global positioning satellite receiver (118) electrically connected with said processing unit; wherein said processing unit is operable to navigate an environment utilizing signals from said global positioning satellite receiver; and wherein said processing unit is operable to navigate an environment utilizing signals from said plurality of perception sensors in a GPS denied environment.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION OF THE EMBODIMENTS

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

It is to be appreciated that the present teaching is by way of example only, not by limitation. The concepts herein are not limited to use or application with a specific system or method. Thus, although the instrumentalities described herein are for the convenience of explanation, shown and described with respect to exemplary embodiments, it will be appreciated that the principles herein may be applied equally in other types of systems and methods involving autonomous vehicles.

Referring to FIGS. 1-12, a harvesting system may utilize specialty equipment and an autonomous operating system ("AOS") 110. The crop harvested may be, but is not limited to, tree nuts (e.g., almonds) and fruit (e.g., olives and stone fruit). In an embodiment, the harvesting system includes a shaker machine M1. The shaker machine M1 includes a plurality of sensors 116, 120, 122, 124, 126, 128 operable to detect one or more trees. The plurality of sensors 116, 120, 122, 124, 126, 128 are operable to communicate signals to a processing unit 112. Shaker machine M1 control parameters, including a pre-determined optimum distance between the shaker machine M1 and the target tree, are input/programmed into the processing unit 112 controller. When the shaker machine M1 is driven to a location next to a tree, the processing unit 112 initiates an automated tree shaking cycle in which one or more of the sensors 116, 120, 122, 124, 126, 128 provides signals representative of the distance from the shaker machine M1 to the tree as input signals to the processing unit 112. The processing unit 112 then calculates a measured distance from the target tree to the shaker machine M1 and compares the measured distance to the predetermined optimum tree distance. Upon reaching a distance between the shaker machine M1 and the target tree that is within the allowable optimum range, the processing unit 112 provides commands to a controller 114 to cause the shaker machine head to move outward towards the tree and halt when the measured distance is equal to or less than a predetermined distance. The processing unit 112 then provides control signals to the controller 114 to cause the shaker machine head to clamp and/or engage the tree, to shake the tree, to unclamp/disengage the tree and/or to retract the shaker machine head. Further input signals to the processing unit 112 include desired engine RPM signals for controlling the engine speed and tree shaking time signals for controlling the duration of the tree shaking.

A shaker machine M1 processing unit 112 may utilize the sensor data to automatically navigate, steer, propel, and/or stop the shaker machine M1 to shake each tree. The processing unit 112 calculates the distances from the shaker machine M1 to the target tree, and the distances from tree to tree. The processing unit 112 utilizes the relative tree locations to calculate the angular adjustment needed and turns a steering caster the desired angle in order to point the shaker machine M1 in the correct direction. The processing unit 112 then causes the shaker machine M1 to move to the recalculated position and the cycle then repeats itself. Several types of sensors 116, 120, 122, 124, 126, 128 may be utilized with the shaker machine M1, including but not limited to, lasers and an ultrasonic sensor.

The shaker machine M1 is utilized to shake the trees selected for harvest such that the crop is released/dropped to the orchard floor. Once on the orchard floor, the crop may be allowed to rest and dry for a period of time (depending on the harvested crop). Minimizing this rest time is important because certain trees cannot be watered during this period, which may cause the trees to be stressed, possibly affecting future yield.

Figure 1:
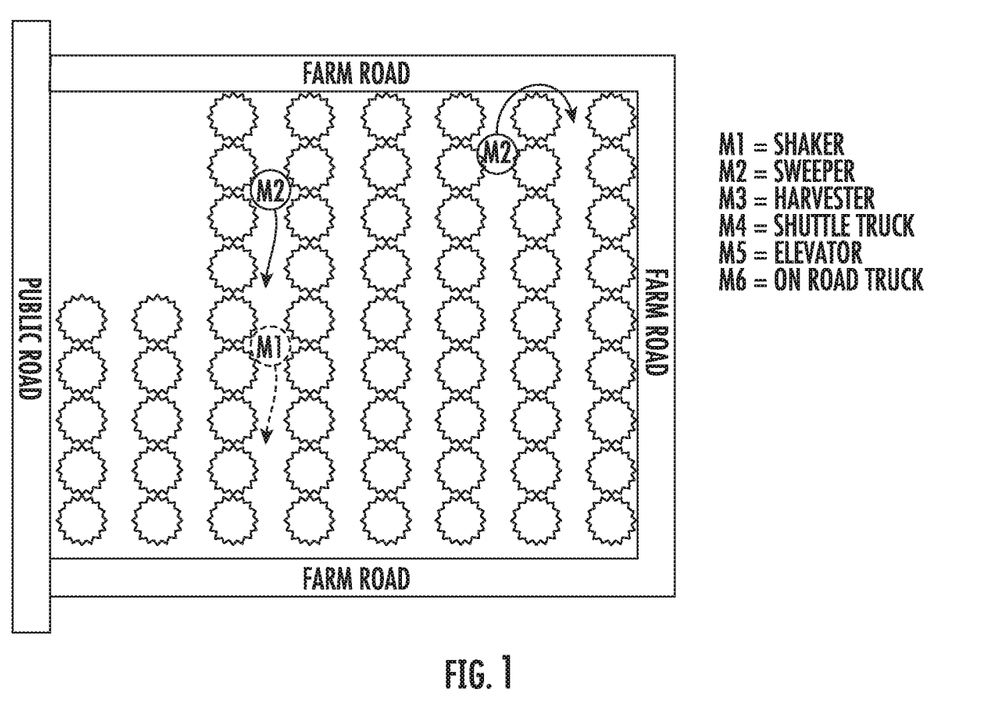
FIG. 1 is a top plan view schematic of a field including autonomous operation system sweeper vehicles according to an embodiment of the present disclosure.

The harvesting system utilizing the AOS 110 may include a sweeper machine M2 having one or more sweeper brushes or heads. Once the crop is rested (where desired), the sweeper machine M2 drives through the orchard and moves the crop into windrows in the center of the aisle between each row of trees utilizing the one or more sweeper brushes. The crop is now ready for pickup, although the crop may be allowed additional rest time in the windrow.

Figure 2:
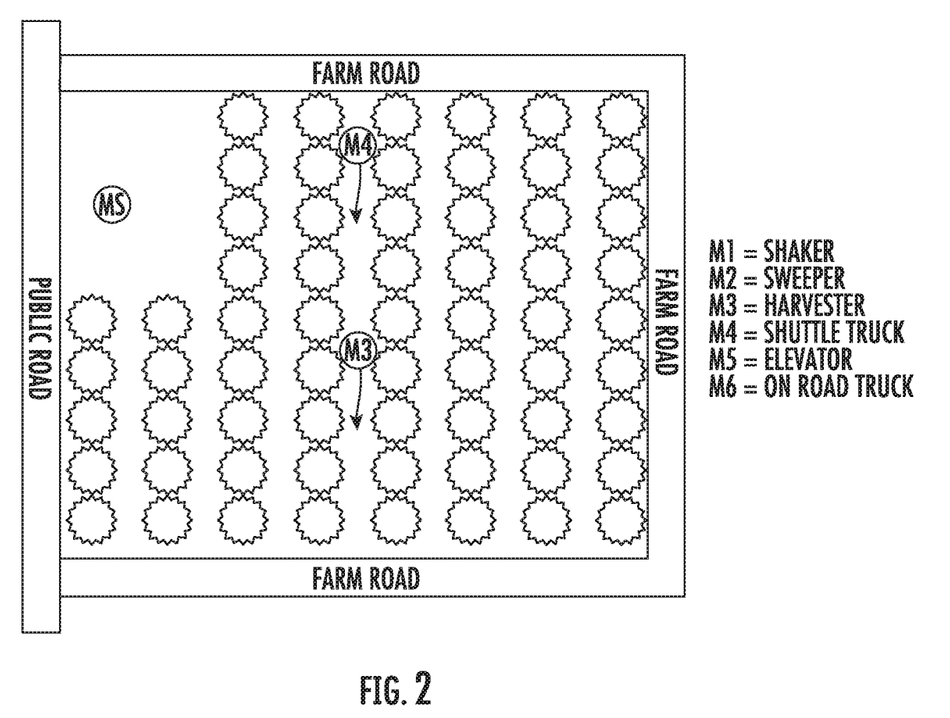
FIG. 2 is a top plan view schematic of the field shown in FIG. 1 including an autonomous operation system harvester vehicle and shuttle truck.
Figure 3:
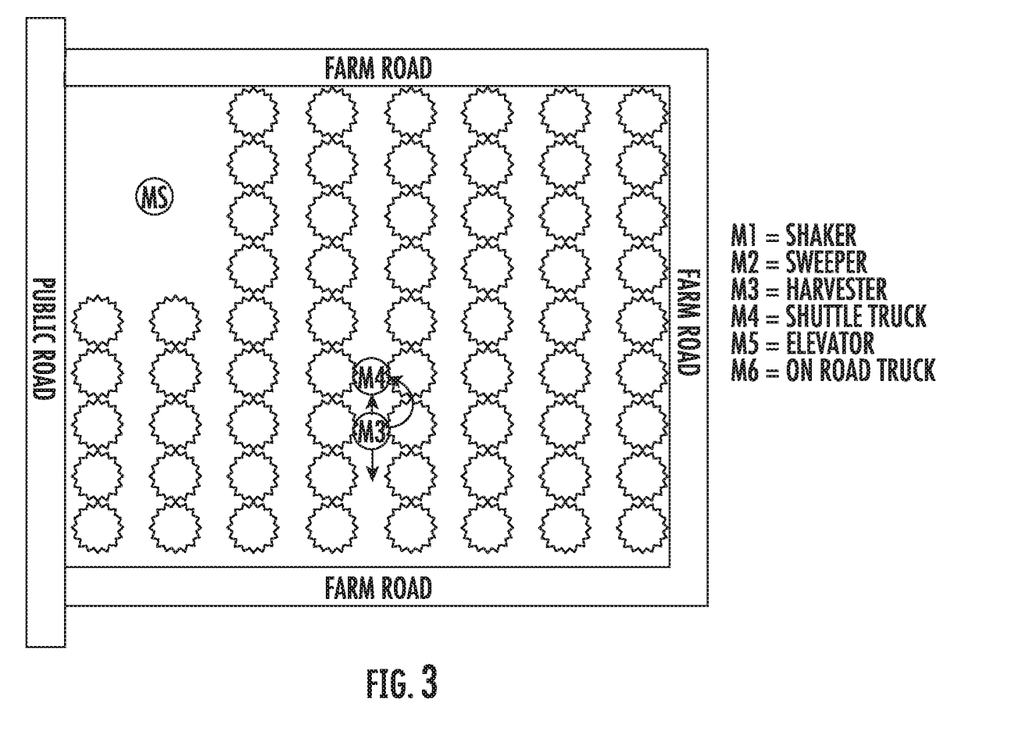
FIG. 3 is a top plan view schematic of the field shown in FIG. 1 including the harvester vehicle transferring a load to the shuttle truck utilizing the autonomous operation system.
Figure 4:
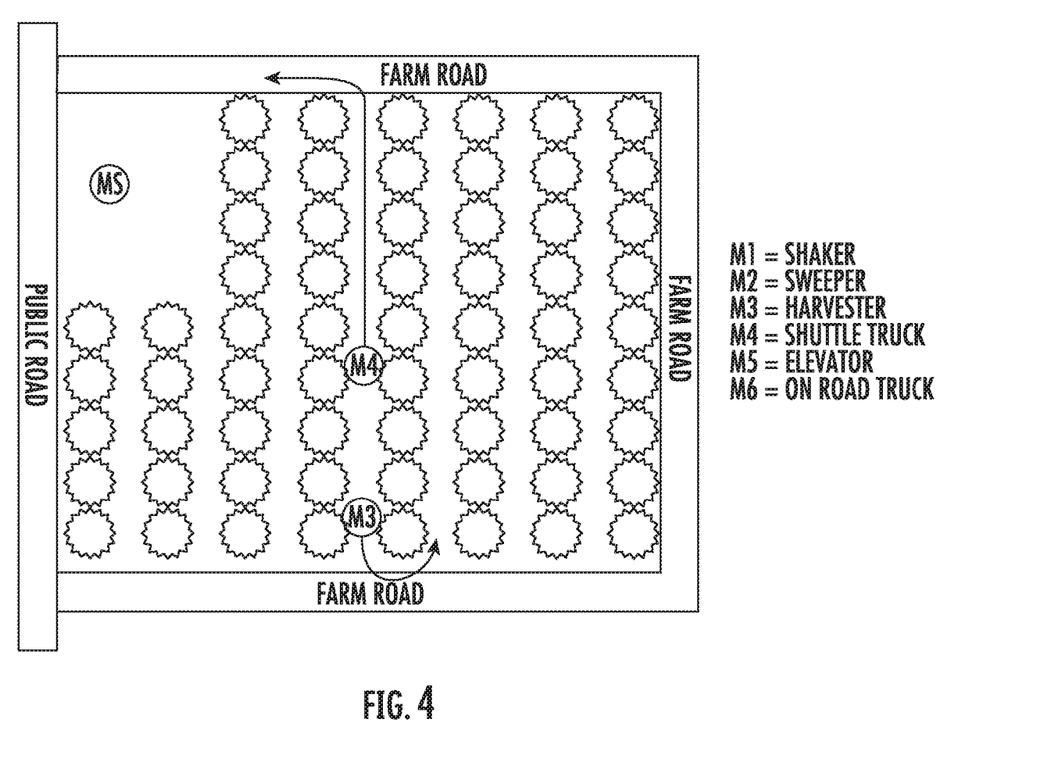
FIG. 4 is a top plan view schematic of the field shown in FIG. 1 including the shuttle truck returning to an elevator utilizing the autonomous operation system.
Figure 5:
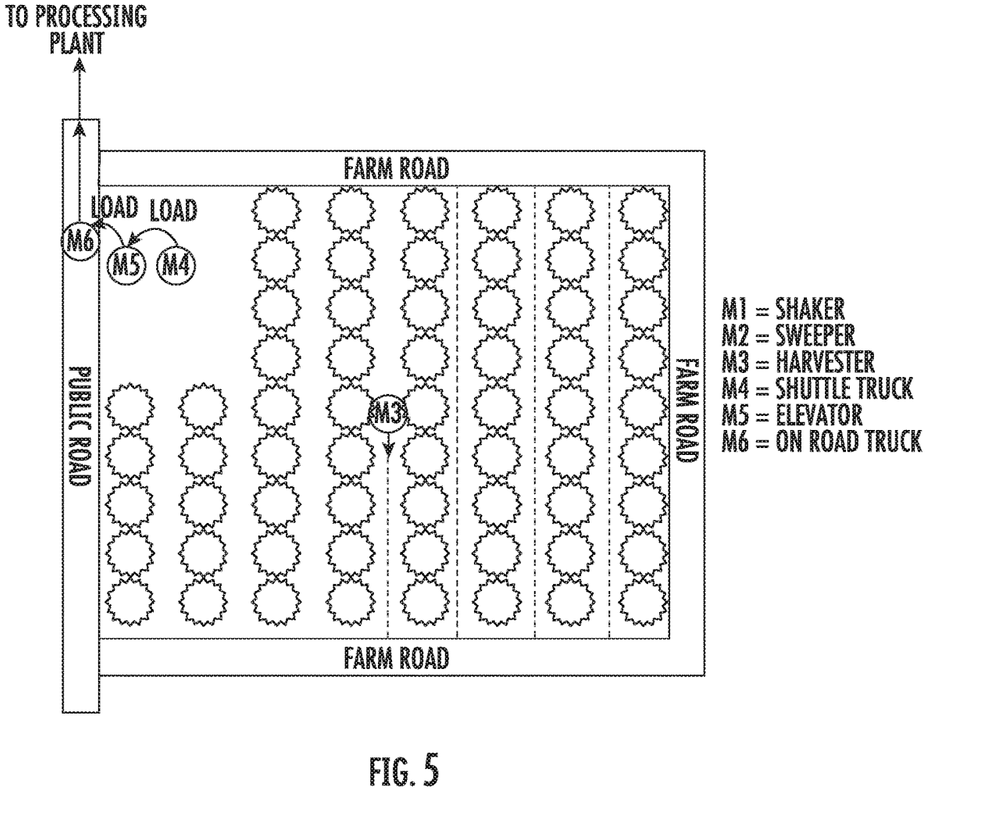
FIG. 5 is a top plan view schematic of the field shown in FIG. 1 including the shuttle truck emptying a load into the elevator utilizing the autonomous operation system.

As illustrated in FIG. 2, the harvesting system utilizing the AOS 110 may include a harvester machine M3. The harvester machine M3 drives through each row of the orchard, collects the windrows, and deposits the windrows into an integrated/built-in storage bin or hopper on the harvester machine M3. The integrated storage on the harvester machine M3 may be limited, so a shuttle truck machine M4 meets the harvester machine M3 in the field, presses up against the harvester machine M3, and matches speed so that the crop can be transferred between the shuttle truck machine M4 and the harvester machine M3. Once the shuttle truck machine M4 is full, the shuttle truck machine M4 reverses direction and drives to an elevator M5 where the load is deposited in a truck M6 that will take the load to a processing facility.

All of these harvest activities typically occur within a two to three-month period of time each year. Traditionally, the harvest results in up to a 50% increase in labor requirements. The increased labor requirements include drivers for the various vehicles. The drivers are required to make few (minor) adjustments to the machines once the job has started. A single block in a single farm requires 15 miles of driving or more. At approximately 3 mph, the process includes 5 hours of driving the length of near identical rows of trees. The repetitiveness and duration of the task may facilitate sub-optimal performance and mistakes during the harvest.

Figure 12:
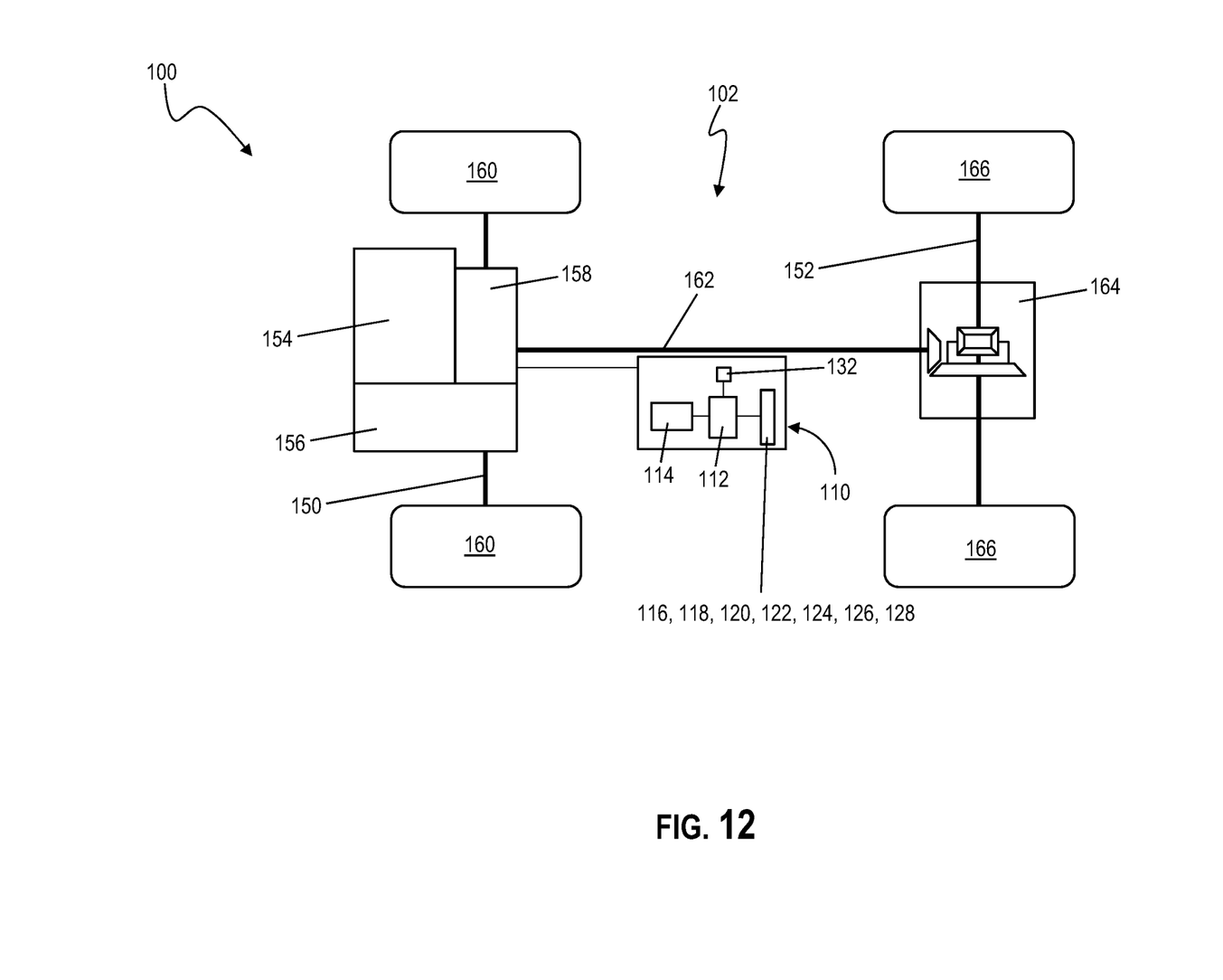
FIG. 12 is a schematic of an autonomous vehicle according to an embodiment of the present disclosure.

In an embodiment, as illustrated in FIG. 12, the AOS 110 is utilized in an autonomous vehicle 102 to enable the autonomous vehicle 102 to complete a task without on-board human operators. The AOS 110 determines an optimal path through the selected terrain, for example an orchard, with user input and navigates through the environment along the path with user input only to deal with unexpected events on an as-needed basis. The AOS 110 may include a safety system that includes monitoring for obstacles, stopping the vehicle when obstacles are detected, and keeping the autonomous vehicle 102 within the optimal path and allowed boundaries during operation thereof. Any adjustments to the autonomous vehicle 102 made during operation of thereof may also be automated. The adjustments may include, for example, sweeper brush positioning and blower settings. A single person may monitor a plurality of autonomous vehicles 102, for example sweeper machines M2, from an on-site location.

In an embodiment, the AOS 110 may be utilized with harvester machines M3 to enable the harvester machines M3 to complete the task of picking up a crop without on-board human operators. The AOS 110 includes determining an optimal path through the orchard with user input and navigating through the environment along the optimal path with user input only to deal with unexpected events on an as-needed basis. The AOS 110 includes a system to monitor for obstacles, stopping or rerouting the harvester machine M3 when obstacles are detected, and keeping the harvester machine M3 within the optimal path and allowed boundaries during operation of the harvester machine M3. Any adjustments needed by the harvester machine M3 during operation of the harvester machine M3 may also be automated. The adjustments may include harvester implement controls and auger settings. A single person may monitor a plurality of harvester machines M3 from an on-farm location.

In another embodiment, the AOS 110 may be utilized with shuttle truck machines M4 to enable the shuttle truck machines M4 to complete a task of unloading the harvester machines M3 without on-board human operators. The AOS 110 includes locating the harvester machines M3 in the field, predicting a future position at a rendezvous time, determining an optimal path through the orchard to rendezvous with the harvester machines M3, navigating through the environment along the optimal path, and performing a docking and speed synchronizing routine with the harvester machine M3 to transfer a load of the crop from the harvester machine M3 to the shuttle truck machines M4. Once the transfer is complete, the shuttle truck machine M4 undocks, plans an optimal path to the elevator M5, and navigates through the environment along the optimal path with user input only on an as-needed basis to deal with unexpected events. The safety system monitors for obstacles, stops the shuttle truck machines M4 when obstacles are detected, prevents collisions with the harvester machines M3, and keeps the shuttle truck machines M4 within the optimal path and allowed boundaries during operation of the shuttle truck machines M4. Any adjustments needed to be made to the shuttle truck machines M4 during operation may also be automated. The adjustments may include auger settings. A single person may monitor a plurality of shuttle truck machines M4 from an on-farm location.

In an embodiment, the AOS 110 may be utilized with shuttle truck machines M4 to enable the shuttle truck machines M4 to complete a task of unloading the harvester machines M3 without on-board human operators.

In an embodiment, a blossom thinning/pruning system may utilize the autonomous operating system ("AOS") 110. The orchard thinned/pruned may be, but is not limited to, an apple orchard. In an embodiment, the blossom thinning/pruning system includes a mobile autonomous pruning machine and/or vehicle. The pruning machine includes a plurality of perception sensors operable to detect trees and the blossoms thereon. The pruning machine perception sensors transmit signals to an on-board processing unit. Pruning machine control parameters, including a pre-determined distance between the pruning machine and the target tree, are input into the processing unit. When the pruning machine is driven to a location next to a tree, the processing unit initiates an automated blossom thinning/pruning cycle in which the perception sensors provide signals representative of the distance from the pruning machine perception sensors to the tree blossoms, and the relative distance between blossoms, as input signals to the processing unit. The processing unit then transmits commands to an on-board controller to operate the pruning machine to eliminate a predetermined number of blossoms. Additional input signals to the processing unit include desired engine RPM signals for controlling the engine speed.

Figure 6:
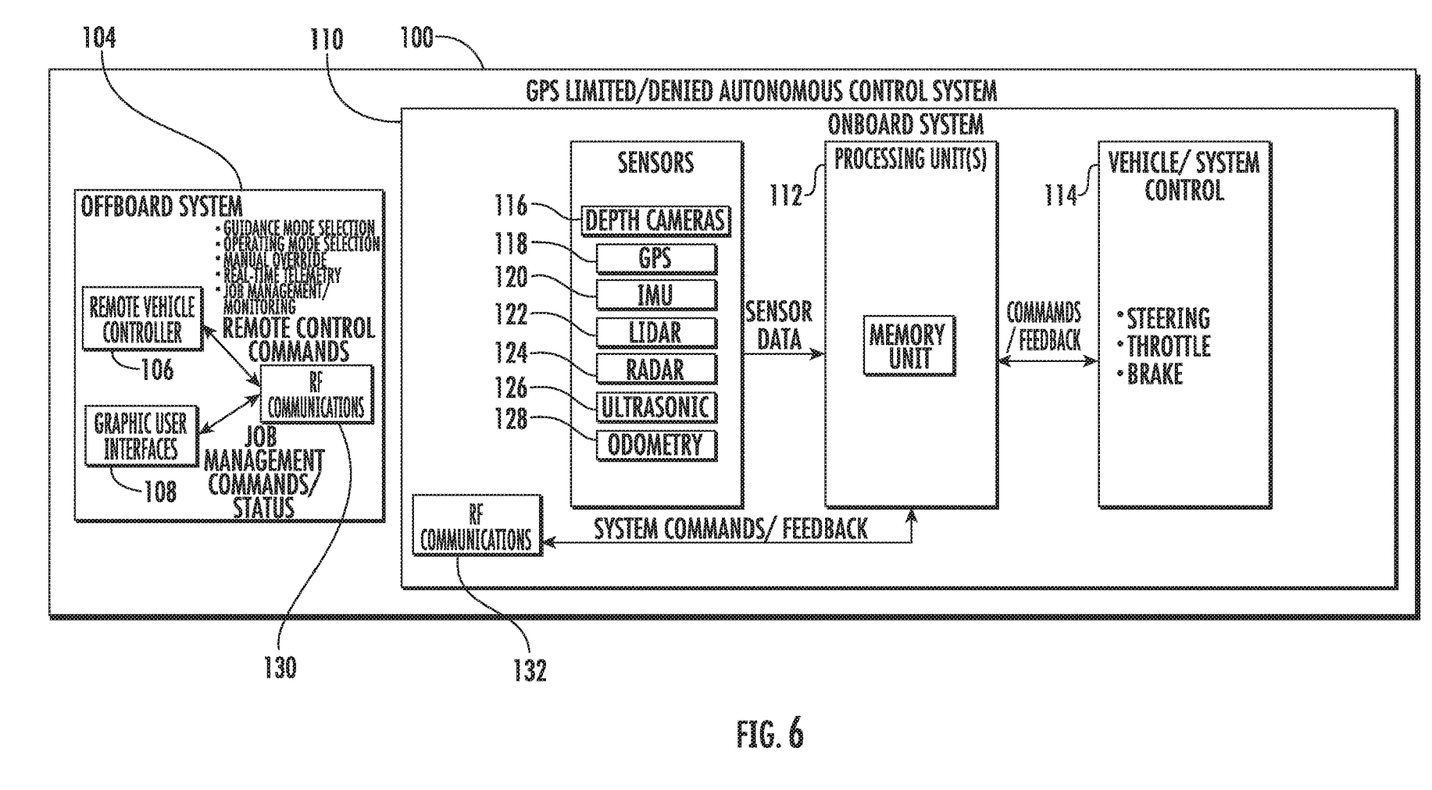
FIG. 6 is a block diagram of the autonomous operation system according to an embodiment of the present disclosure.
Figure 7:
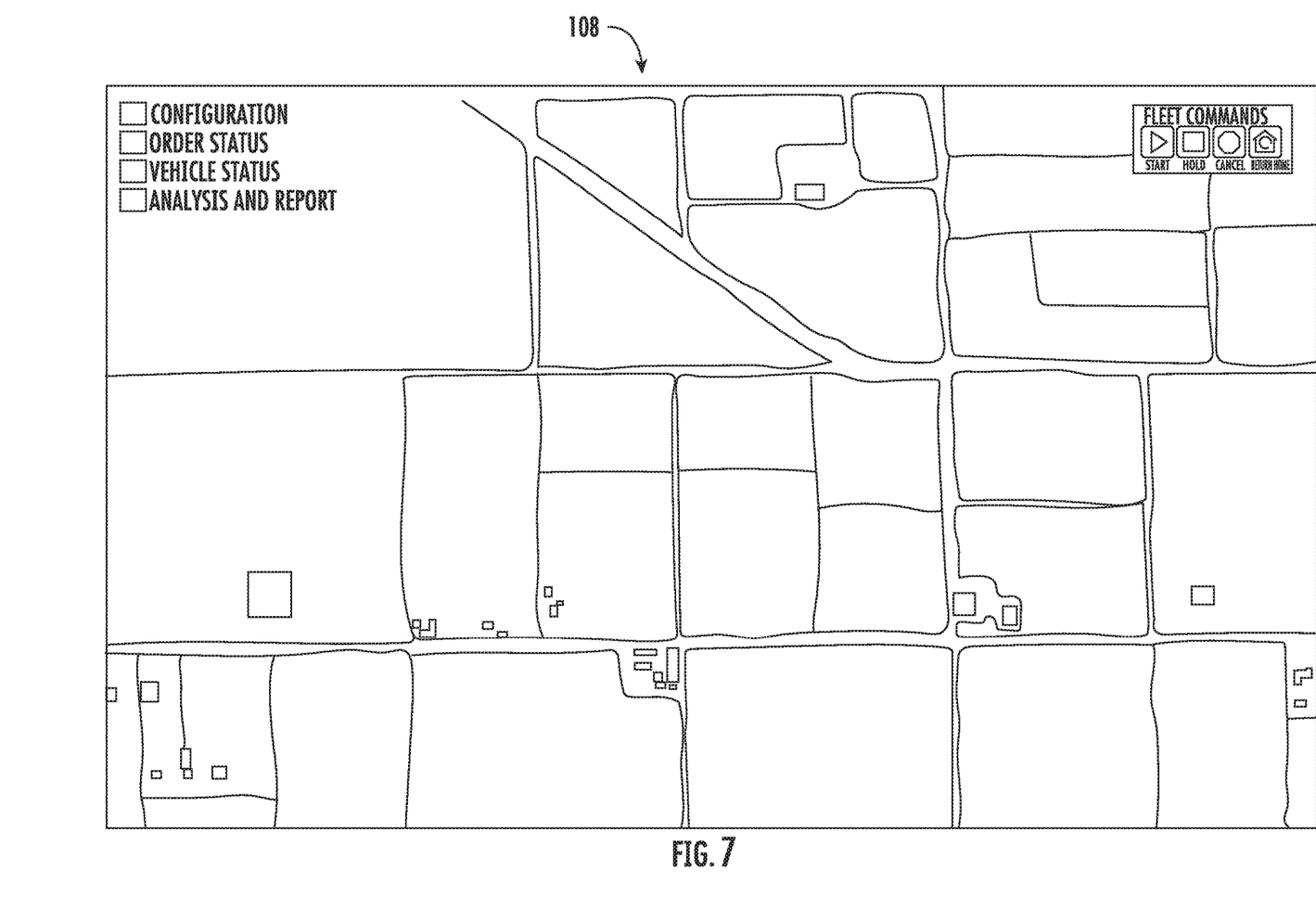
FIG. 7 is a view of a graphical user interface utilized to interact with the autonomous operation system shown in FIG. 6.
Figure 8:
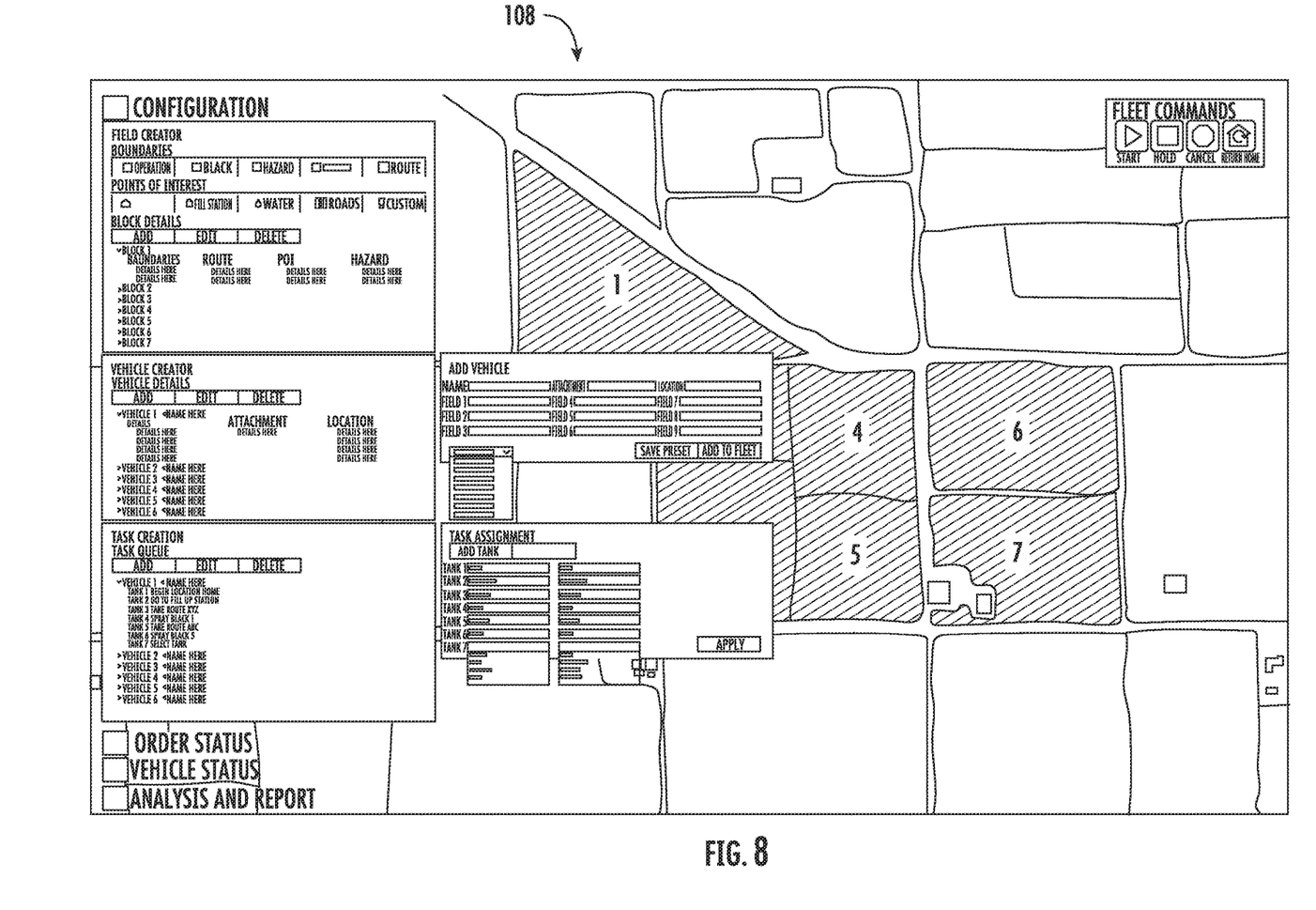
FIG. 8 is a view of the graphical user interface shown in FIG. 7.
Figure 9:
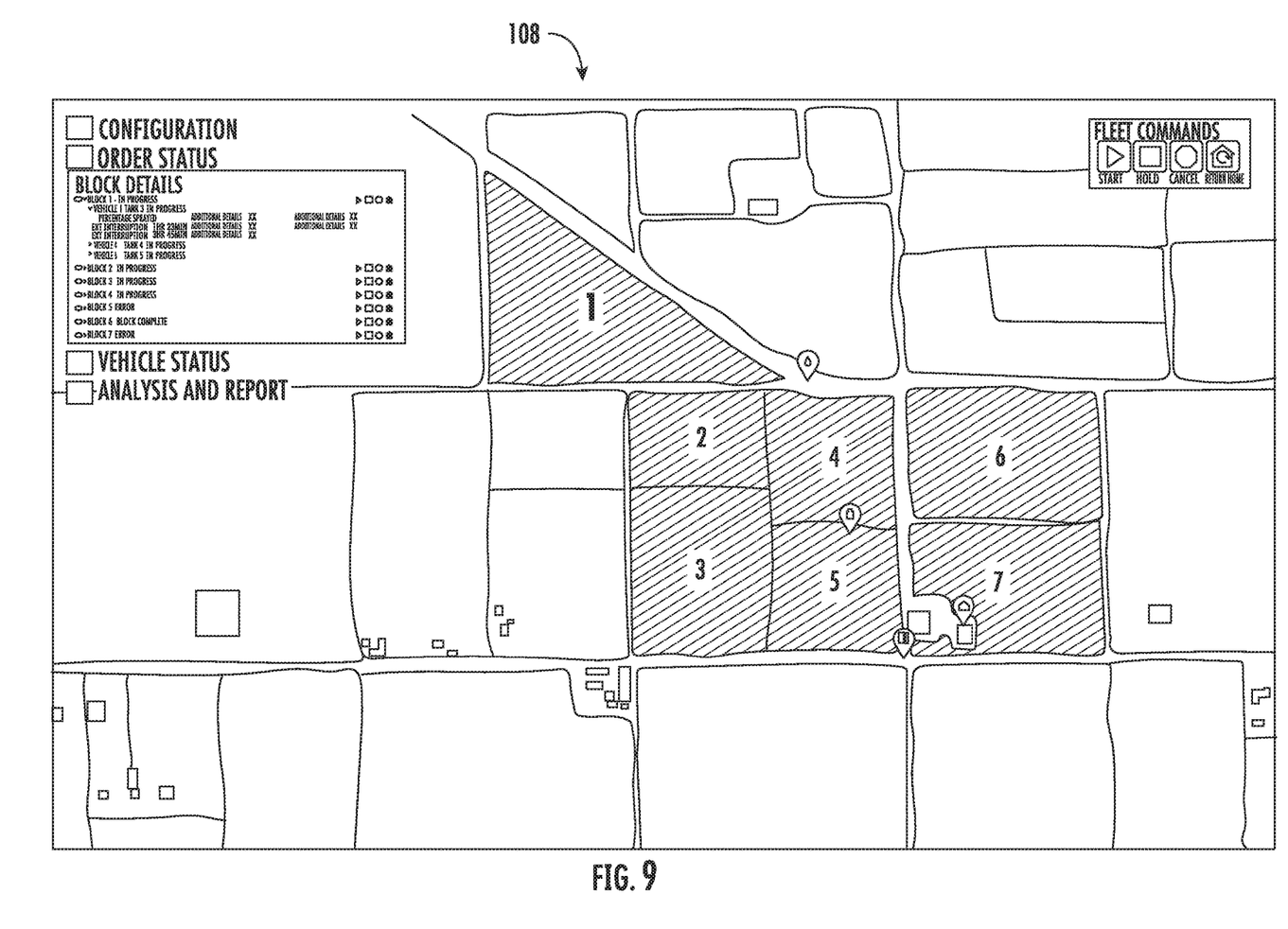
FIG. 9 is a view of the graphical user interface shown in FIG. 7.
Figure 10:
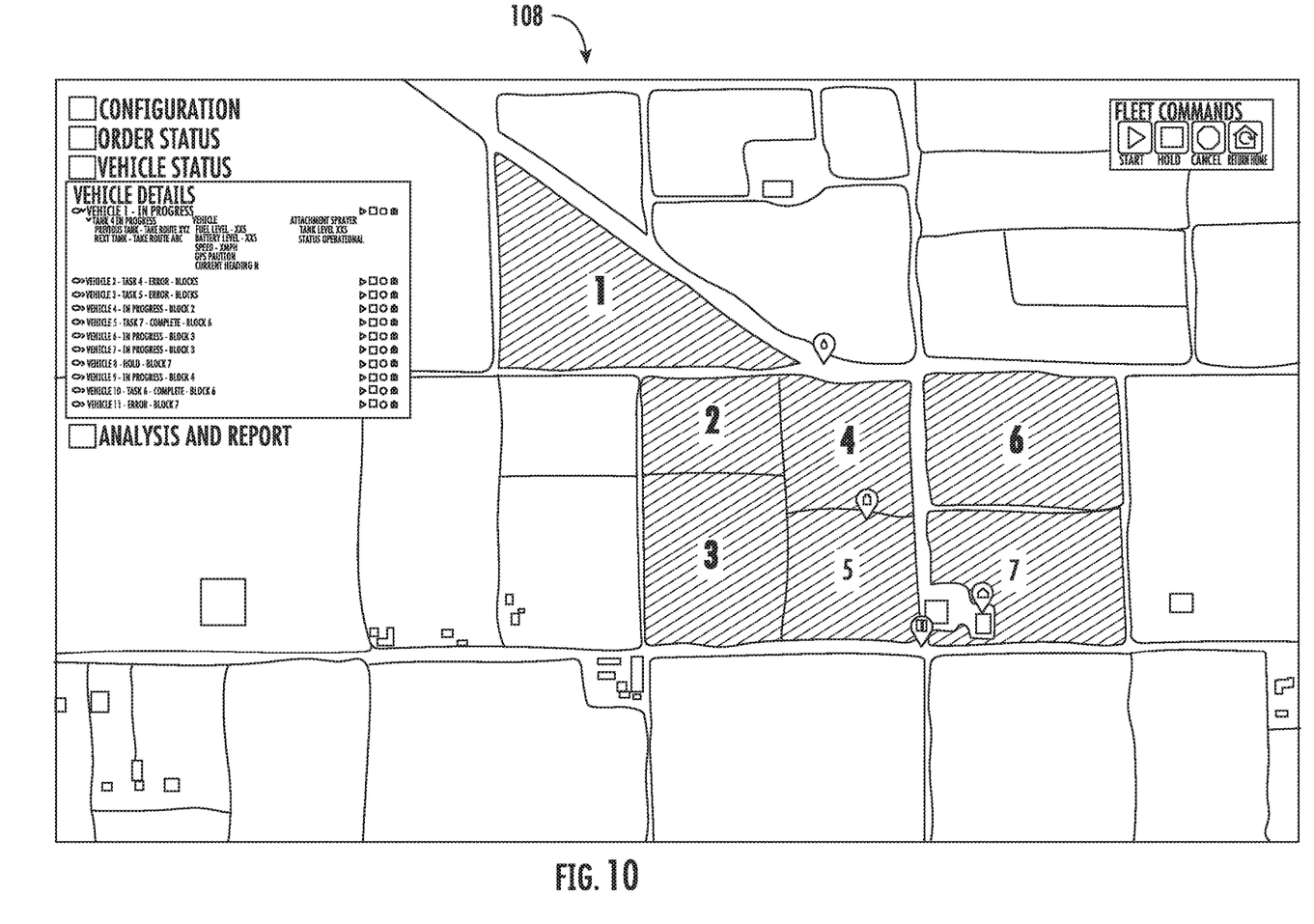
FIG. 10 is a view of the graphical user interface shown in FIG. 7.
Figure 11:
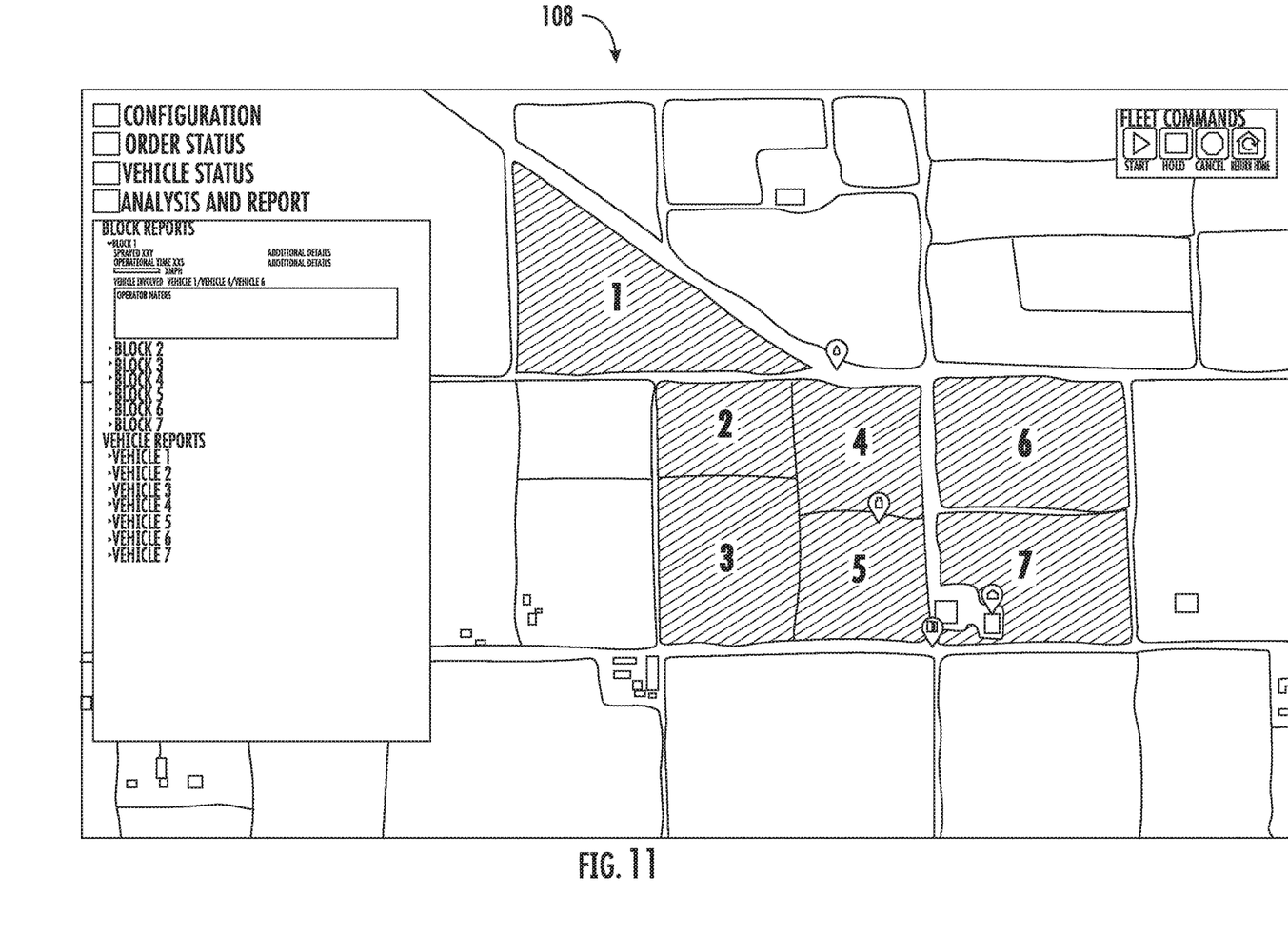
FIG. 11 is a view of the graphical user interface shown in FIG. 7.

As illustrated in FIGS. 6 and 12, in an embodiment, an autonomous vehicle system 100 includes an autonomous vehicle 102, the AOS 110, and a remote control 104. The remote control 104 includes a user handstation 106 operable to receive user inputs, and a user interface 108 operable to display sensor information from the autonomous vehicle 102. The remote control 104 is operable to communicate with the autonomous vehicle 102 through a wireless connection 130, 132.

The autonomous vehicle 102 includes a plurality of sensors 116, 118, 120, 122, 124, 126, 128 operable to transmit their sensor data to a processing unit 112. In an embodiment, the sensor 116 is a depth camera, the sensor 118 is a global positioning system receiver ("GPS"), the sensor 120 is an inertial measurement unit ("IMU"), the sensor 122 is a light detection and ranging unit ("LIDAR"), the sensor 123 is a radar, the sensor 126 is an ultrasonic unit, and the sensor 128 is an odometry unit. Embodiments of the processing unit 112 include at least one processor and at least one memory unit. The processing unit 112 is in electrical communication with a controller 114. The controller 114 is operable to receive command signals from the processing unit 112 and control the steering, throttle, and brakes of the autonomous vehicle 102 utilizing the sensor data. In an embodiment, the controller 114 is also operable to receive signals from the sensor array 116, 118, 120, 122, 124, 126, 128 to provide harvesting and pruning/thinning signals to the autonomous vehicle 102.

In operation, when the autonomous vehicle 102 enters an operating environment, the on-board sensors 116, 118, 120, 122, 124, 126, 128 provide localization and situational awareness data to the processing unit 112. The sensor data and status information enable the processing unit 112 to determine the optimal guidance mode and locates the autonomous vehicle 102 with respect to any detected feature or GPS waypoints in the vicinity. The localization process performed utilizing the processing unit 112 creates heading and path planning commands utilized by the controller 114 for steering, throttling and braking the autonomous vehicle 102 to move unimpeded in its environment while simultaneously mapping its surroundings.

In an embodiment, the processing unit 112 is operable in three autonomous vehicle guidance modes: (1) GPS Guidance, (2) Localization Guidance, and (3) Yaw Rate Guidance. The processing unit 112 of the of the autonomous vehicle system 100 operates to change between the guidance modes when GPS data is limited or denied and/or when the perception sensors utilized in Localization Guidance experience a fault. GPS Guidance allows the autonomous vehicle 102 to navigate in an environment via specified GPS waypoints. Localization Guidance allows the autonomous vehicle 102 to navigate an environment based on detectable objects or features, identified via the perception sensors 116, 120, 122, 124, 126, 128, in the area. Yaw Rate Guidance allows the autonomous vehicle 102 to maintain its current heading while mitigating any angular rates about the vertical steering axis. The Yaw Rate Guidance mode may be used as a safety mode, but is not so limited, should the GPS 118 and the perception sensors 116, 120, 122, 124, 126, 128 experience a fault simultaneously.

The memory unit of the processing unit 112 is able to save position/location information of detected environmental features and trees, and provide a map of the environment surrounding the autonomous vehicle 102 during operation. Coordinates and position information of environmental features and trees relative to the location of the autonomous vehicle AOS 110 are saved in the memory unit and are updated as the autonomous vehicle 102 moves about the environment. This ability to save and map detected features provides relative navigation information that can be used to determine the location of one environmental feature with respect to other environmental features. In an embodiment, the processing unit 112 for the autonomous vehicle 102 is developed using model-based design. This model-based design allows the processing unit 112 to be rapidly modified and updated in a simulation environment before being autocoded directly to the on-board autonomous vehicle 102.

In an embodiment, the AOS 110 is utilized with the autonomous vehicle 102 operating in a visually occluded environment that may be denied GPS data. As illustrated in FIG. 12, in an embodiment, the autonomous vehicle 102 includes at least a primary axle 150 and a secondary axle 152. The autonomous vehicle 102 further includes a power source 154, such as but not limited to, an internal combustion engine ("ICE") or an electric motor/generator. The power source 154 may be referred to herein as a motor. The power source 154 is operably connected with a front drive unit 158. In an embodiment, a gear box 156 may be located operably between the power source 154 and the front drive unit 158. The front drive unit 158 is operably connected with a set of front wheels 160. A propeller shaft 162 may be operably connected with the power source 154 to transmit power to the rear drive unit 164. Further, the rear drive unit 164 is operably connected with a set of rear wheels 166.

The autonomous vehicle 102 includes the on-board AOS 110 having the plurality of sensors 116, 118, 120, 122, 124, 126, 128. The sensor array 116, 118, 120, 122, 124, 126, 128 is in electrical connection with the processing unit 112. The processing unit 112 is in further electrical connection with the controller 114 for, inter alia, steering, throttling, and braking the autonomous vehicle 102. In addition, the processing unit 112 is in electrical communication with the wireless connection 132. The controller 114 may also be in electrical connection with a steer-by-wire system.

The AOS 110 navigates throughout an environment via sensor fusion techniques that enhance situational awareness using a combination of sensors 116, 118, 120, 122, 124, 126, 128. The AOS 110 may be outfitted with a tactical-grade IMU 120 and a single GPS antennae 118 to allow for a GPS/INS (inertial navigation system) solution. In addition, the AOS 110 is operable to receive signals from laser, vision, and sound-based localization sensors (e.g., LIDAR 122, RADAR 124, ultrasonic 126, and depth cameras 116) to allow for obstacle detection and continued operation in a GPS-denied environment.

As the AOS 110 enters an operating environment, the on-board sensor suite 116, 118, 120, 122, 124, 126, 128 provides localization and situational awareness data to the processing unit 112. The processing unit 112 handles high-level decision making for the vehicle, including handling guidance mode selections, transitions, and faults.

As the sensor data and status information is acquired, the processing unit 112 determines the optimal guidance mode and locates the AOS 110 with respect to any detected features or GPS waypoints in the vicinity. This localization process creates heading and path planning commands for steering, throttling, and braking 114, thereby allowing the autonomous vehicle 110 to move unimpeded in the environment while simultaneously mapping the surroundings.

GPS Guidance Mode allows the AOS 110 to navigate an environment via specified GPS waypoints. The AOS 110 latitude/longitude and target GPS waypoint latitude/longitude may specify a heading command for the AOS 110 to follow. Knowledge of previous GPS waypoint latitude/longitude allows for rhumb line guidance, forcing the AOS 110 to maintain a straight line between the previous and target GPS waypoints.

Localization Guidance Mode allows the AOS 110 to navigate an environment based on detectable objects and/or features in an area. These features may be determined via the on-board, Non-GPS based sensors such as the LIDAR 122, RADAR 124, depth camera 116, and/or ultrasonic 126. Upon identifying the local features, the Localization Guidance Mode generates a heading command to safely navigate around or between objects.

Yaw Rate Guidance Mode allows the AOS 110 to maintain the current heading while mitigating any angular rates about a vertical steering axis. This mode may be utilized as a safety mode should the GPS and localization sensors experience a fault simultaneously.

Using the on-board localization sensors 116, 118, 120, 122, 124, 126, and 128, the PROCESSING UNIT 112 has the ability to save detected features and provide a map of the surrounding environment during operation. Coordinates of features relative to the location of the AOS 110 may be saved in memory and updated as the AOS 110 moves about the environment. Environment mapping provides relative navigation information that may be used to determine the location of one feature with respect to another. The on-board vision system and depth camera 116 may be used to enhance the environment mapping through object detection and classification. Further, with available GPS data, the position of each local feature may be determined.

The autonomous vehicle 102 and the remote control 104 include a wireless connection 130, 132. The wireless connection 130, 132 may comprise a radio frequency transmitter/receiver such as, but not limited to, a Wi-Fi connection. However, other modes of wireless communication may be employed with the wireless connection 130, 132. The AOS 110 is operable to receive remote signals from the user interface 108 via wireless communication 130, 132. The user interface 108 may be, but is not limited to, a tablet and/or laptop. The wireless connection 130, 132 between the user interface 108 and the AOS 110 enables the user to change guidance modes and monitor telemetry and sensor data in real-time. The on-board vision system and depth camera 116 provide the user with visual feedback of the current autonomous vehicle environment and operating conditions. Real-time status information about the AOS 110 and the processing unit 112 is provided to the user interface 108 via the wireless connection 130, 132.

While the AOS 110 provides fully autonomous navigation and control of the autonomous vehicle 102, the remote control 104 has the ability to override the processing unit 112 guidance modes and take control of the AOS 110 via the wireless handstation 106. Steering, throttling, and braking commands to the controller 114, along with guidance mode selections, may be input directly from the wireless handstation 106, allowing the user to teleoperate the AOS 110.

As described above, the processing unit 112 for the AOS 110 may be developed using a model-based design. This allows the processing unit 112 to be rapidly modified and updated in a simulation environment/model before being autocoded directly to the on-board AOS 110. An advantage of model-based design is the ability to test the exact code that guides the AOS 110 before operating in a real environment. In addition, model-based design allows for concurrent documentation and revision control of the processing unit 112.

As described above, the AOS 110 is able to operate in a remote, GPS-denied environment while simultaneously mapping the environment. Perception/localization sensors 116, 120, 122, 124, 126, 128 identify and track features in the vicinity of the AOS 110. The perception sensor signals are utilized by the processing unit 112 to create heading and path planning commands communicated to the controller 114 for obstacle avoidance and navigation. The perception sensor data and/or processed information may be saved in the memory unit of the processing unit 112 for relative navigation purposes. Should GPS data be available, GPS positioning of the autonomous vehicle 102 is also possible. However, many environments prevent GPS signal transmission. For example, an orchard canopy is capable of blocking GPS signals.

In an embodiment, the autonomous vehicle 102 and the AOS 110 may be utilized in subterranean environments. For example, in mining and tunneling operations GPS signals are blocked by soil and sediment. The AOS Localization Guidance mode enables automated navigation of equipment without GPS signals.

In an embodiment, the autonomous vehicle 102 and the AOS 110 may be utilized in military environments. For example, in conflict zones GPS signals may be jammed. The AOS Localization Guidance mode enables automated navigation of equipment transports, scout vehicles, and medical extraction vehicles without GPS signals.

In an embodiment, the autonomous vehicle 102 and the AOS 110 may be utilized in military environments. For example, in subsea environments GPS signals may be blocked or limited by the water. The AOS Localization Guidance mode enables automated navigation of submersibles for inspection and/or maintenance of oil and gas pipelines.

The autonomous vehicle 102 and the AOS 110 provide a number of advantages. For example, the autonomous vehicle AOS 110 provides mechanisms and systems to consistently make accurate feature (e.g., tree) distance and location calculations despite the fact that obstacles (e.g., tree branches and canopy) can interfere with an ultrasonic measurement of the feature distance. Further, the autonomous vehicle 102 can provide accurate navigation even in a dusty, GPS limited/denied, and unpredictable environment.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable combination. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An autonomous agricultural vehicle, comprising:
   a wheel-set operably connected with a power source;
   a processing unit including a memory unit;
   a controller operable to receive and transmit signals to said processing unit, wherein said controller is operable to control said wheel-set;
   a wireless communication system electrically connected with said processing unit;
   a global positioning satellite receiver electrically connected with said processing unit;
   a first perception sensor electrically connected with said processing unit, wherein said first perception sensor is operable to detect environmental features; and
   a second perception sensor electrically connected with said processing unit, wherein said second perception sensor is operable to detect a feature of a tree;
   wherein said processing unit is operable to navigate an environment utilizing signals from said global positioning satellite receiver and said first perception sensor in a GPS guidance mode, wherein said processing unit is configured to transmit rhumb line guidance heading command signals to said controller as a function of said signals from said global positioning satellite receiver; and
   wherein said processing unit is operable to navigate said environment utilizing signals from said first and second perception sensors without signals from said global positioning satellite receiver in a localization guidance mode, wherein said processing unit is configured to transmit heading and path command signals to said controller as a function of said signals from said first and second perception sensors;
   wherein said processing unit is operable to switch from said GPS guidance mode to said localization guidance mode.

2. The autonomous agricultural vehicle according to claim 1, wherein said first perception sensor is one of a depth camera, an inertial measurement unit, a light detection and ranging unit, a radar, an ultrasonic unit, and an odometry unit.

3. The autonomous agricultural vehicle according to claim 1, wherein said second perception sensor is one of a depth camera, an inertial measurement unit, a light detection and ranging unit, a radar, an ultrasonic unit, and an odometry unit.

4. The autonomous agricultural vehicle according to claim 1, wherein said environment comprises an orchard and said environmental features comprise a crop.

5. The autonomous agricultural vehicle according to claim 4, further comprising a tree shaking machine head operable to engage and shake said tree, wherein said first and second perception sensors communicate information concerning a distance between said tree shaking machine head and said tree to said processing unit, and wherein said processing unit is operable to provide signals to said controller for engaging said tree.

6. The autonomous agricultural vehicle according to claim 4, further comprising a sweeper brush operable to move said crop into windrows, wherein said first and second perception sensors communicate information concerning a distance between said sweeper brush and said tree to said processing unit.

7. The autonomous agricultural vehicle according to claim 4, further comprising a storage bin operable to receive said crop, and wherein said storage bin is operable to transfer said crop to a shuttle truck.

8. The autonomous agricultural vehicle according to claim 1, wherein said processing unit is operable to receive and store environmental feature position information received from said first and second sensors in said memory unit, and wherein said processing unit is operable to enhance said environmental feature position information with object detection and classification.

9. The autonomous agricultural vehicle according to claim 8, wherein said processing unit is operable to utilize a first environmental feature position information stored in said memory unit to determine a relative location of a second environmental feature.

10. The autonomous agricultural vehicle according to claim 8, wherein said processing unit is operable to navigate in a yaw rate guidance mode, wherein said processing unit is operable to switch from GPS guidance mode to localization guidance mode when global positioning satellite data is limited or denied.

11. An autonomous vehicle, comprising:
a wheel-set operably connected with a power source;
a processing unit, including a memory unit;
a controller operable to receive and transmit signals to said processing unit, wherein said controller is operable to control said wheel-set;
a wireless communication system electrically connected with said processing unit;
a plurality of perception sensors operable to transmit a signal to said processing unit, wherein said plurality of perception sensors are operable to detect environmental features, and wherein said processing unit is configured to receive updated environmental feature coordinates via automatic coding from a simulation environment; and
a global positioning satellite receiver electrically connected with said processing unit;
wherein said processing unit is operable to navigate an environment utilizing signals from said global positioning satellite receiver, wherein said processing unit is configured to transmit rhumb line guidance heading command signals to said controller as a function of said signals from said global positioning satellite receiver; and
wherein said processing unit is operable to navigate said environment utilizing signals from said plurality of perception sensors, wherein said processing unit is configured to transmit heading and path command signals to said controller as a function of said signals from said first and second perception sensors without said signals from said global positioning satellite receiver.

12. The autonomous vehicle according to claim 11, wherein said wireless communication system comprises a radio frequency transmitter and a radio frequency receiver.

13. The autonomous vehicle according to claim 11, wherein said controller is operable to adjust steering and throttling commands utilizing signals received from said plurality of perception sensors.

14. The autonomous vehicle according to claim 13, wherein said controller is electrically connected with said wheel-set and operably connected with said power source.

15. The autonomous vehicle according to claim 13, wherein said controller transmits steering and throttling command information to said processing unit.

16. The autonomous vehicle according to claim 11, wherein said plurality of perception sensors comprise a depth camera, an inertial measurement unit, a light detection and ranging unit, a radar, an ultrasonic unit, and an odometry unit.

17. The autonomous vehicle according to claim 11, further comprising a remote control having a user interface, wherein said remote control is operable to transmit commands to said processing unit, and wherein said remote control is configured to transmit a command to operate said autonomous vehicle in said GPS guidance mode, said localization guidance mode, a yaw rate guidance mode, or a real-time telemetry mode.

18. The autonomous vehicle according to claim 11, wherein said processing unit is configured to utilize information transmitted by said plurality of perception sensors for at least one of path planning, trajectory, obstacle avoidance, obstacle collision prevention, environment mapping, and position estimation.

19. The autonomous vehicle according to claim 11, wherein said processing unit is operable to navigate in a yaw rate guidance mode, wherein said processing unit is operable to switch from said GPS guidance mode to said localization guidance mode when global positioning satellite data is limited or denied, and wherein said processing unit is operable to switch from said GPS guidance mode or said localization guidance mode to said yaw rate guidance mode when global positioning satellite data is limited or denied and signals from said plurality of perception sensors are limited or unavailable.

20. The autonomous vehicle according to claim 11, wherein said processing unit is operable to navigate said environment utilizing engine RPM signals and said GPS guidance mode, said localization guidance mode, and a yaw rate guidance mode.

* * * * *